United States Patent
Kitaoka et al.

[15] 3,670,225
[45] June 13, 1972

[54] SYSTEM FOR BRAKING ELECTRIC MOTOR VEHICLES

[72] Inventors: Takashi Kitaoka; Akira Shirashoji, both of Amagasaki, Japan

[73] Assignee: Mitsubishi Denki Kabushiki Kaisha, Tokyo, Japan

[22] Filed: June 12, 1970

[21] Appl. No.: 45,718

[30] Foreign Application Priority Data

June 19, 1969 Japan..................................44/48600

[52] U.S. Cl............................................................318/270
[51] Int. Cl. .........................................................H02k 3/14
[58] Field of Search..................318/258, 270, 275, 276, 280, 318/269, 380; 317/16

[56] References Cited

UNITED STATES PATENTS 3,297,930  1/1967  Payne....................................318/269
3,436,639  4/1969  Burkett et al. .....................317/16 UX Primary Examiner—Bernard A. Gilheany
Assistant Examiner—W. E. Duncanson, Jr.
Attorney—Robert E. Burns and Emmanuel J. Lobato

[57] ABSTRACT

An electric motor vehicle having at least one DC traction motor is provided with a braking system including a DC chopper device for controlling the speed of the traction motor, and a voltage detector for detecting the voltage across a capacitor during regenerative braking of the motor vehicle and providing a triggering signal whenever the detected voltage exceeds a predetermined magnitude due to the interruption of a load consuming the regenerative power. The triggering signal is applied to a switching thyristor connected across the chopper device to fire the thyristor thereby preventing a further increase in the capacitor's voltage. Also a high speed current decreasing device having a predetermined time delay is actuated in response to the triggering signal and then an associated line switch is opened to interrupt the circuit.

3 Claims, 4 Drawing Figures

3,670,225

SYSTEM FOR BRAKING ELECTRIC MOTOR VEHICLES

BACKGROUND OF THE INVENTION

This invention relates to improvements in a system for braking an electric motor vehicle including a direct current (DC) chopper device.

When an electric motor vehicle performs the steady state operation in the regenerative braking mode by turning ON and OFF a DC chopper device involved with a proper period, a current is supplied through the associated trolley wire to a load connected to the latter. to absorb the regenerative power. If the load disconnects from the trolley wire the current is abruptly interrupted while the chopper device can not flow this abrupt change in current and continues to effect its control. Therefore the current can flows into a capacitor operatively coupled to the chopper device to greatly increase a voltage across the capacitor. This leads to the necessity of designing electric equipment including the chopper device on the motor vehicle so as to withstand voltages very much higher than the steady state voltage thereof resulting in a loss in economy.

There have been already proposed various attempts to prevent the voltage across the capacitor from greatly increasing. Some of the attempts have not been much effective and some of the attempts have led to a fear that the associated traction motors will damage.

SUMMARY OF THE INVENTION

Accordingly it is an object of the invention to eliminate the above-mentioned drawbacks of the prior art practice by the provision of an effective protective system for electric motor vehicles.

It is another object of the invention to provide a new and improved system for braking an electric motor vehicle capable of preventing an excessive increase in voltage across a filtering capacitor involved in the regenerate braking mode of operation even upon an interruption or an abrupt decrease in a load consuming electric power generated by the regenerative braking operation and fed back to the associated trolley wire.

The invention accomplishes these objects by the provision of a system for braking an electric motor vehicle comprising at least one DC traction motor, a chopper device for controlling the DC motor, a flywheel semiconductor diode connected to the chopper device, and a filtering capacitor disposed on the cathode side of the flywheel diode, characterized by a resistor connected across the chopper device through a control switch on the anode or cathode side of the flywheel diode the control switch being controlled to permit the resistor to be connected in parallel to the chopper device.

The control switch may be preferably controlled in accordance with either a voltage across the filtering capacitor or a potential on the anode or cathode side of the flywheel diode.

BRIEF DESCRIPTION OF THE DRAWINGS

The invention will become more readily apparent from the following detailed description taken in conjunction with the accompanying drawing in which.

DESCRIPTION OF THE PREFERRED EMBODIMENT

Figure 1:
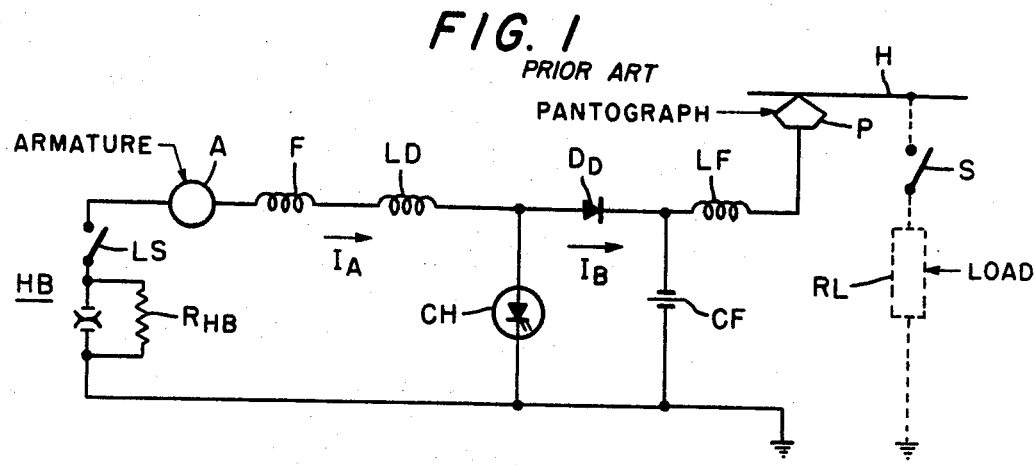
FIG. 1 is a schematic diagram of a conventional circuit for controlling a series traction motor for an electric motor vehicle including a DC chopper device in the regenerative braking mode of operation.

Referring now of the drawings and FIG. 1 in particular, it is seen that an arrangement disclosed herein is representative of an electric train and comprises a DC series traction motor including an armature A and a field F, a smoothing reactor LD, a flywheel semiconductor diode DD, a filtering reactor LF and a pantograph P interconnected in series circuit relationship in the named order. While an electric motor vehicle is generally driven by a plurality of such traction motors connected in series and/or parallel circuit relationship, a single electric motor is shown in FIG. 1 only for purposes of illustration. The flywheel diode DD has its anode electrode connected to both the smoothing reactor LD and a DC chopper device CH on the anode side and its cathode electrode connected to both the filtering reactor LF and a filtering capacitor CF on one side with the cathode side of the chopper device CH connected to ground and also to the other side of the capacitor CF.

The armature A is connected to ground through a line switch LS and a high speed current decreasing or limiting device HB having a current decreasing resistor RHB connected thereacross. The current decreasing device HB is responsive to the occurrence of an emergency to rapidly insert the current decreasing resistor RHB into the circuit and the line switch LS cooperates with the current decreasing operation performed by the current decreasing device HB and is immediately opened to interrupt the circuit.

The pantograph P is slidably in contact with a trolley wire W which is, in turn, connected to a power absorbing load RL through a switch S shown in its open position. Such a load may be a separate electric train or trains energized by the same trolley wire W to be put in the power running mode of operation.

DC chopper devices and their operation are well known in the art and are described in detail in various literatures and patent specifications so that the DC chopper device CH need not be described here. It is sufficient to be said that in the steady state regenerative braking mode of operation, the voltage induced across the armature A is maintained at a magnitude less than the magnitude of the voltage on the trolley wire W while the DC chopper device CH is turned ON and OFF with a suitable period to maintain the armature current $I_A$ at a predetermined magnitude. Under these circumstances, the sum of the voltage developed across an inductance (which is formed mainly of inductances due to both the field F and the filtering reactor LD present in the circuit with the traction motor during the turn-off period of the DC chopper device CH) and the voltage induced across the armature A exceeds the voltage on the trolley wire W. This causes a regenerative current $I_B$ to be delivered to the trolley wire W through the flywheel diode DD and the filtering reactor LF until the current is absorbed or consumed by the load RL connected to the trolley wire W through the closed switch S.

If the switch S is open in the regenerative braking mode of operation as above described, the current IB flowing through the load RL is abruptly interrupted. However, a control system (not shown) for the chopper device CH can not immediately follow this interruption of the current and instead continues to effect the control made up to this time. This permits the flow of regenerative current $I_B$ to continue. Therefore that current flows into the capacitor CF to charge it until a voltage $V_{CF}$ across the capacitor CF is rapidly increased beyond a magnitude equal to that of the steady state voltage $E_o$ on the trolley wire W before the switch S was open.

Figure 2:
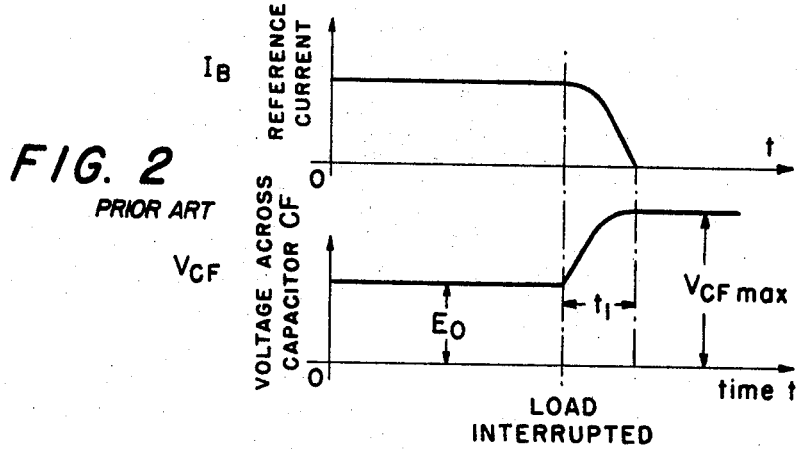
FIG. 2 is a graphic representation of waveforms of current and voltage developed upon rappidly decreasing a regenerative load connected in the circuit shown in FIG. 1.

Preceiving the mean magnitude of current, the phenomenon just described may be explained by realizing that the electric energy accumulated by the inductance of the circuit with the traction motor has been transferred to the capacitor CF. The regenerative current $I_B$ and the voltage $V_{CF}$ across the capacitor CF will vary with time as shown in FIG. 2 wherein the upper graph illustrates the regenerative current $I_B$ (ordinate) plotted against time (abscissa) and the lower graph illustrates the voltage $V_{CF}$ (ordinate) plotted against time (abscissa) with the time axis common to both graphs. A charging time $t_1$ for the capacitor CF is equal to a quarter of a resonance period of a circuit composed of an inductance L and a capacitance CF. Namely the charging time $t_1$ is expressed by the equation $$t_1 = \tfrac{1}{4} \times 2\pi \sqrt{L \cdot CF}$$

Assuming, for example, that the capacitance CF is 1,000 microfarads and the inductanc L is 10 millihenries, the charging time will be calculated at about 5 milliseconds. Also assuming that in the regenerative braking mode of operation the voltage $E_o$ on the trolley wire has a value of 1,650 volts and the regenerative current $I_B$ has a steady state value of 800 amperes, maximum voltage $V_{CF\,max}$ across the capacitor will be calculated at about 4,200 volts from the equation $$V_{CF\,max} = E_o + I_B \sqrt{L/CF}$$

This indicates that various circuit elements including the chopper device as shown in FIG. 1 should be designed to withstand voltages very much higher than their steady state voltages respectively thereby leading to a great waste.

In order to prevent the voltage across the capacitor CF from increasing to such a high magnitude, it has been conceived to detect the voltage across the capacitor CF and rapidly open the circuit with the traction motor upon detecting a voltage exceeding a certain limit thereby to interrupt the regenerative current $I_B$. Even with the use of a high speed current decreasing device commonly employed with electric motor vehicles such as shown at HB in FIG. 1, this measure is not serviceable because the opening of such a device requires a time interval of from 10 to 15 milliseconds which is too long as compared with the charging time $t_1$ for the capacitor CF as above described.

Also there has been devised a system for preventing the regenerative current $I_B$ from flowing into the capacitor CF, comprising means for detecting the voltage across the capacitor CF as in the above case, means responsive to the detected voltage in excess of a certain limit to continuously conduct the main thyristor or thyristor in the chopper device, that is to say, to shortcircuit the circuit with the traction motor through the use of the chopper device CH. That system has been effective for suppressing a rise in voltage across the capacitor for the reason that the thyristor or thyristors is or are sufficiently rapidly fired. The system however has not been too practical in that with the circuit with the traction motor shortcircuited during the travel of the associated electric motor vehicle at a high speed, a high current is abruptly developed to effect a flash over of the traction motor prior to opening the motor circuit by means of the high speed current decreasing device HB and the line switch LS. Also there has been a fear that the traction motor would be damaged due to the development of a high impulsive torque.

The invention contemplates to eliminate the disadvantages of the prior art practice as above described.

Figure 3:
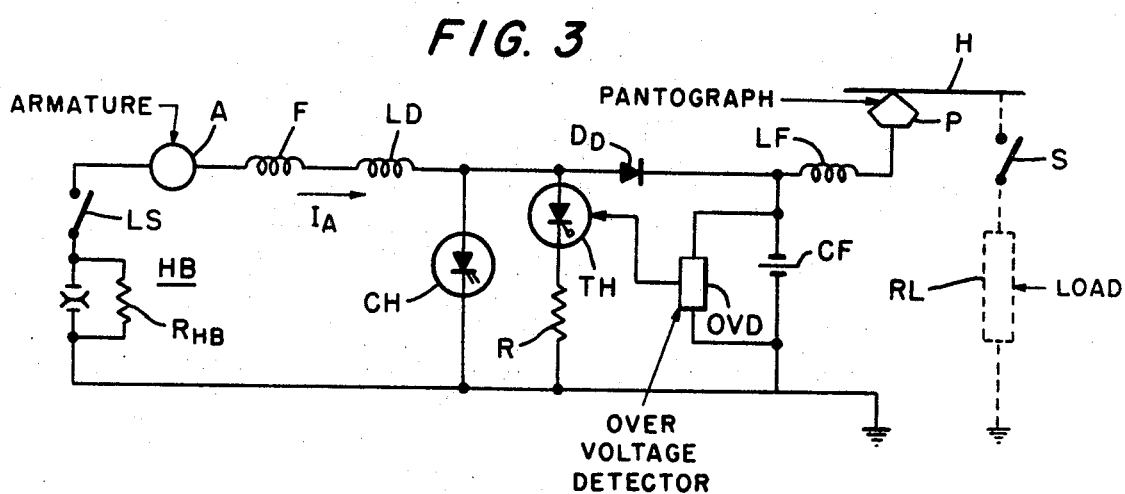
FIG. 3 is a schematic diagram of a circuit for effecting a regenerative braking constructed in accordance with the principles of the invention.

One embodiment of the invention is illustrated in FIG. 3 wherein like reference characters designate the components identical to those shown in FIG. 1. The arrangement illustrated comprise, in addition to the circuit elements as shown in FIG. 1, an overvoltage detector OVD connected across the capacitor CF, a control switch shown as a switching thyristor TH having its anode electrode connected to the junction of the chopper device CH and the flywheel diode DD and its cathode electrode connected to ground through a resistor R.

The overvoltage detector OVD comprises, for example, a comparator having a DC potential transformer and a PNPN-type switching element. The detector OVD is responsive to the voltage across the capacitor CF exceeding a predetermined voltage $V_D$ somewhat higher than the normal voltage on the trolley wire and provides an output triggering signal. This output triggering signal is applied to the switch or thyristor TH to fire it and is also applied to a relay to effect actuation of the high speed current decreasing device HB.

Figure 4:
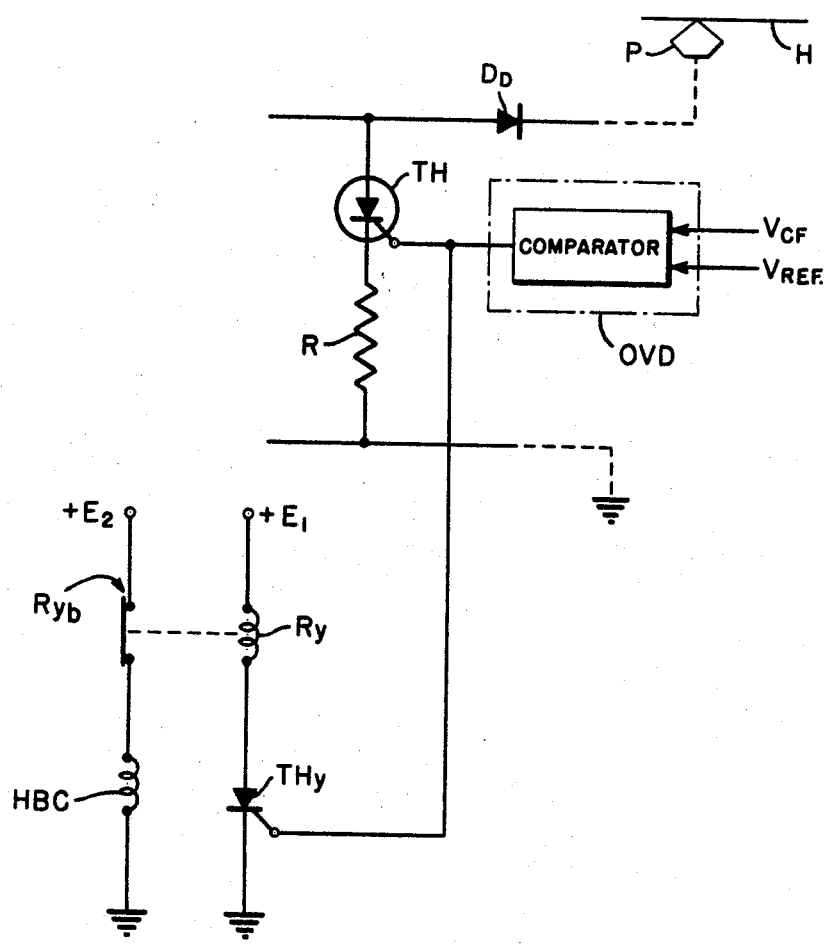
FIG. 4 is a schematic diagram of a portion of the circuit shown in FIG. 3.

As seen in FIG. 4, the overvoltage detector OVD is connected to control switches TH and THy. The switch THy controls a relay which comprises an operating winding Ry connected between a positive potential source $+E_1$ and ground potential through the thyristor THy and a set of stationary and movable contacts Ryb connected between another positive potential source $+E_2$ and ground potential through a coil HBC. The coil HBC is operative to open and close the high speed current decreasing device or high speed current limiter HB shown in FIG. 3. The overvoltage detector OVD is illustrated in FIG. 4 as including a comparator for comparing the voltage $V_{CF}$ across the filtering capacitor CF with a reference voltage $V_{REF}$ and providing an output triggering signal whenever the voltage $V_{CF}$ exceeds the reference voltage $V_{REF}$.

The output signal from the comparator and therefore from the overvoltage detector OVD is applied to the thyristors TH and THy to turn them ON and render them conducting. The conduction of the thyristor or control switch THy effects energization of the relay winding Ry to open the contacts Ryb resulting in the deenergization of the coil HBC. Therefore the high speed current limiter HB is opened followed by the opening of the current breaker LS.

In the regenerative braking mode of operation, the disconnection of the load RL from the trolley wire W causes the voltage across the capacitor CF to increase as above described in conjunction with FIGS. 1 and 2. The overvoltage detector OVD responds to the voltage across the capacitor CF in excess of the abovementioned threshold voltage $V_D$ therefor to develop an output signal and apply same to the thyristor TH to fire it. This results in the completion of a closed circuit traced from the armature A of the traction motor through the field F of the motor, the smoothing reactor LD, the now conducting thyristor TH, the resistor R, the high speed current decreasing device HB and the closed line switch LS and back to the armature. Under these circumstances a current $I_R$ flowing through the resistor R is expressed by $$I_R = E_M/(R+r)$$

where
$E_M$ = electromotive force of the armature A
$R$ = resistance of the resistor R
$r$ = resistance of the abovementioned closed circuit minus the R.

By properly selecting the magnitude of resistance $R$, the current $I_R$ can be preliminarily set to a magnitude higher than the maximum magnitude of the regenerative current $I_B$ in the steady state but sufficiently lower than minimum current that could render any one or more of the traction motor and the associated circuit elements faulty. When doing so, the firing of the thyristor TH causes a potential on the anode side of the diode Dd to be lower than a potential on the cathode side thereof until the current terminates flowing through the diode Dd. In this way the voltage across the capacitor CF has been limited to the threshold voltage $V_D$ set for the overvoltage detector OVD.

On the other hand, the triggering signal from the overvoltage detector OVD has been applied to the high speed current decreasing device HB to release its holding circuit (not shown). Therefore the current decreasing device HB is open with a predetermined time delay inherent thereto to connect the resistor RHB in the closed circuit. Following this, the line switch LS is opened to interrupt the closed circuit.

Therefore it will readily be understood that the resistor R and the switching thyristor TH are required only to withstand a current flowing therethrough for a very short period of time between a time when the voltage across the capacitor CF has just exceeded the threshold voltage $V_D$ for the overvoltage detector OVD and a time when the line switch LS has been open. Accordingly the resistor R and the thyristor TH can be smallsized, lightweight and inexpensive.

While the invention has been illustrated and described in conjunction with a single preferred embodiment thereof it is to be understood that numerous changes and modifications may be resorted to without departing from the spirit and scope of the invention. For example, the overvoltage detector OVD may be connected so as to detect a voltage across any point on the connection of the diode Dd to the pantograph P and ground rather than the voltage across the capacitor CF. Also the series arrangement of thyristor TH and resistor R may be connected across any point on the connection of the diode Dd to the pantograph P and ground. In the latter case, a low regenerative current $I_B$ causes a current to flow from the trolley wire into the thyristor and resistor resulting in an increase in current capability of each of the two as compared with the case both circuit elements are connected to the diode Dd on that side thereof remote from the pantograph. However the measure is advantageous in that a charge on the capacitor CF discharges through the resistor R to lower the voltage across the capacitor CF to that trolley voltage lower than the threshold voltage $V_D$ for the overvoltage detector.

Further while the control switch TH has been shown as being a thyristor the same may be any desired switch other than the switching thyristor illustrated. In addition, the invention is equally applicable to shunt and compound traction motors so far as they are of the direct current type.

What we claim is:

1. In an electric motor vehicle having at least one DC traction motor and a pantograph serially connected to said DC traction motor and slidable along a feeder line during operation of the electric motor vehicle: a braking system comprising a chopper device connected to said DC traction motor operable in an ON-OFF mode to control the speed of said DC traction motor; a semiconductor diode having an anode side connected to said DC traction motor and a cathode side connected to said pantograph; a filtering capacitor connected to the cathode side of said semiconductor diode; a series circuit connected to said anode side of said semiconductor diode in parallel with said chopper device and comprising a resistor and switching means operable in a conducting mode and a nonconducting mode and being responsive to a triggering signal to be placed in said conducting mode thereby rendering the voltage on said anode side of said semiconductor diode lower than that on said cathode side to block current flow through said semiconductor diode; a current limiter and current breaker device operable in response to a triggering signal to sequentially limit the current flow and then terminate the current flow to said DC traction motor; voltage detecting means for detecting the voltage across said filtering capacitor and providing a triggering output signal whenever the detected voltage exceeds a predetermined value ; and means for applying said triggering output signal to both said switching means and current limiter and current breaker device.

2. In an electric motor vehicle according to claim 1; wherein said switching means comprises a thyristor connected to said voltage detecting means.

3. In an electric motor vehicle having at least one DC traction motor connected to a pantograph and supplied with electric power during operation of the motor vehicle through a feeder line; a chopper device connected to said DC traction motor to control same; a flywheel semiconductor diode connected between one end of said chopper device and a pantograph disposed on the motor vehicle; a filtering capacitor connected to the cathode side of said flywheel diode; a series circuit connected in parallel with said chopper device and comprising a resistor and a first thyristor; a voltage detector operative to detect the voltage across said filtering capacitor during regenerative braking of the motor vehicle and provide an output signal whenever the detected voltage across said capacitor exceeds a predetermined magnitude to put said first thyristor in its conducting state; a high speed current limiter and a high speed current breaker connected in a main circuit containing therein said DC traction motor; coil means operative when energized to actuate said high speed current limiter and high speed current breaker; and a second thyristor operative in response to the output signal from said voltage detector to effect energization of said coil means.

* * * * *